United States Patent
Kim et al.

(10) Patent No.: US 10,355,288 B2
(45) Date of Patent: Jul. 16, 2019

(54) FUEL CELL

(71) Applicant: HYUNDAI MOTOR COMPANY, Seoul (KR)

(72) Inventors: Kyung Min Kim, Namyangju-si (KR); Yoo Chang Yang, Gunpo-si (KR); Sang Mun Jin, Yongin-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 81 days.

(21) Appl. No.: 15/147,157

(22) Filed: May 5, 2016

(65) Prior Publication Data

US 2017/0170491 A1    Jun. 15, 2017

(30) Foreign Application Priority Data

Dec. 15, 2015 (KR) .......................... 10-2015-0179177

(51) Int. Cl.
*H01M 8/0258* (2016.01)
*H01M 8/1007* (2016.01)
(Continued)

(52) U.S. Cl.
CPC ....... *H01M 8/0258* (2013.01); *H01M 8/0247* (2013.01); *H01M 8/0267* (2013.01);
(Continued)

(58) Field of Classification Search
CPC ............. H01M 8/0258; H01M 8/1006; H01M 8/0247; H01M 8/1007; H01M 8/04156;
(Continued)

(56) References Cited

U.S. PATENT DOCUMENTS 5,230,966 A * 7/1993 Voss .................. H01M 8/04074
429/434
2004/0247982 A1* 12/2004 Sabin .................. H01M 8/0247
429/514
(Continued)

FOREIGN PATENT DOCUMENTS

FR        2913925     * 12/2009  ............. H01M 8/026
JP    2008-251204     * 10/2008  ............. H01M 8/02
(Continued)

OTHER PUBLICATIONS

FR 2913925 ESPACENET English Machine Translation with Abstract Dec. 25, 2009.*
(Continued)

*Primary Examiner* — Jonathan G Leong
*Assistant Examiner* — Aaron J Greso
(74) *Attorney, Agent, or Firm* — Morgan, Lewis & Bockius LLP

(57) ABSTRACT

A fuel cell includes a reaction layer including: a membrane electrode assembly (MEA); and gas diffusion layers (GDLs) each of which is disposed at both side surfaces of the MEA. A porous separation layer has one surface adhered to one surface of the reaction layer and supplied with reaction gas, and a cathode bipolar plate has a panel shape and adhered to another surface of the porous separation layer. A front end part of the cathode bipolar plate having a manifold that is supplied with the reaction gas and having a plurality of diffusion channels through which the reaction gas directs from the manifold toward the porous separation layer. The cathode bipolar plate has a partition wall channel which separates the porous separation layer, which extends in a direction in which the reaction gas flows, and which extends from the manifold in a diagonal direction.

12 Claims, 5 Drawing Sheets

(51) Int. Cl.
 *H01M 8/20* (2006.01)
 *H01M 8/04* (2016.01)
 *H01M 8/1006* (2016.01)
 *H01M 8/0247* (2016.01)
 *H01M 8/0267* (2016.01)
 *H01M 8/04119* (2016.01)
 *H01M 8/04082* (2016.01)
 *H01M 8/04291* (2016.01)

(52) U.S. Cl.
 CPC ... *H01M 8/04156* (2013.01); *H01M 8/04201* (2013.01); *H01M 8/04291* (2013.01); *H01M 8/1006* (2013.01); *H01M 8/1007* (2016.02)

(58) Field of Classification Search
 CPC ......... H01M 8/04201; H01M 8/04291; H01M 8/0267; H01M 8/02; H01M 8/04; H01M 8/10
 See application file for complete search history.

(56) References Cited

U.S. PATENT DOCUMENTS

2008/0145738 A1* 6/2008 Benson ............... H01M 4/8605
 429/483

2011/0183226 A1* 7/2011 Nishiyama ........ H01M 8/04335
 429/450
2011/0262831 A1* 10/2011 Dadheech ............... H01M 8/10
 429/479

FOREIGN PATENT DOCUMENTS

| JP | 2008-251204 A | 10/2008 | | |
|---|---|---|---|---|
| JP | 2011-113725 A | 6/2011 | | |
| KR | 10-2010-0020715 A | 2/2010 | | |
| KR | 10-2011-0056481 A | 5/2011 | | |
| KR | 10-2015-0121959 A | 10/2015 | | |
| WO | WO 03/036747 | * | 5/2003 | ............. H01M 8/02 |
| WO | WO 03/092096 | * | 11/2003 | ............ H01M 8/202 |
| WO | 2009/157981 A1 | | 12/2009 | |
| WO | WO 2014/173751 | * | 10/2014 | .......... H01M 8/0202 |

OTHER PUBLICATIONS

JP 2008-251204 ESPACENET English Machine Translation with Abstract Oct. 16, 2008.*

Korean Office Action issued in Application No. 10-2015-0179177 dated Nov. 28, 2016.

* cited by examiner

➡ FLOW OF CONDENSED WATER
⇒ FLOW OF REACTION GAS

FUEL CELL

CROSS REFERENCE TO RELATED APPLICATION

The present application claims the benefit of priority to Korean Patent Application Number 10-2015-0179177 filed on Dec. 15, 2015, the entire content of which is incorporated herein for all purposes by this reference.

TECHNICAL FIELD

The present disclosure relates, in general, to a fuel cell, and more particularly, to a fuel cell capable of distributing a uniform flow of reaction gas and cooling water over the entire reaction region and smoothly discharging condensed water generated by a chemical reaction within the fuel cell.

BACKGROUND

A fuel cell generally includes a membrane electrode assembly (MEA) having a catalyst layer which induces a chemical reaction between hydrogen and oxygen. Bipolar plates are disposed at both side surfaces of the MEA and facilitate discharging of water while supplying the hydrogen and the oxygen into the MEA.

The MEA and the bipolar plates, which selectively supply hydrogen or oxygen disposed at both side surfaces of the MEA, respectively, form one fuel cell. The fuel cell is stacked in plural to form a fuel cell stack.

To maximize the performance of the fuel cell, a porous member of the bipolar plate uniformly disperses a surface pressure and improves performance of diffusing reaction gas and discharging generated water. The porous member includes members having: a micro porous structure of conductive porous bodies such as a three-dimensional structure made of a metal or carbon material and having micro pores; a three-dimensional structure having a porous structure formed by weaving a metal wire in a net shape; a three-dimensional structure formed by forming holes on a metal thin plate or scratching the metal thin plate, etc. All the members uniformly disperse the surface pressure.

However, in the related art, the flow of reaction gas and generated water may not be controlled due to the application of the porous member, and a reaction area may not be efficiently used. Further, when moisture in the fuel cell is maintained in a supersaturated state, the micro pores of the porous member are clogged to reduce stability and efficiency of the fuel cell.

The contents described as the related art have been provided only for assisting in the understanding for the background of the present disclosure and should not be considered as corresponding to the related art known to those skilled in the art.

SUMMARY

The present disclosure has been made keeping in mind the above problems occurring in the related art, and the present disclosure is intended to propose a fuel cell capable of distributing a uniform flow of reaction gas and cooling water over the entire reaction region and smoothly discharging condensed water generated by a chemical reaction within the fuel cell.

According to one embodiment in the present disclosure, a fuel cell includes: a reaction layer including a membrane electrode assembly (MEA) and gas diffusion layers (GDLs) each of which disposed at both side surfaces of the MEA; a porous separation layer having one surface adhered to one surface of the reaction layer and supplied with reaction gas; and a cathode bipolar plate having a panel shape and adhered to one surface of the porous separation layer, having a front end part provided with a manifold supplied with reaction gas, and having a plurality of diffusion channels through which the reaction gas directs from the manifold toward the porous separation layer. Some of the diffusion channels extend to a rear end part. The cathode bipolar plate has a partition wall channel, which separates the porous separation layer, extends in a direction in which the reaction gas flows, and extends in a diagonal direction.

The partition wall channel of the cathode bipolar plate may extend in the diagonal direction that is a gravity direction to direct from a top toward a bottom, in a state in which the partition wall channel is applied to the fuel cell.

The fuel cell may further include: an anode bipolar plate configured to adhere to one surface of the cathode bipolar plate and repeatedly bent in one side direction and the opposite side direction to form a gas channel through which the reaction gas passes to a first opened space of one side of the anode bipolar plate and a cooling channel through which a cooling medium passes to a second opened space of another side of the anode bipolar plate.

The cooling channel and the gas channel of the anode bipolar plate may have front end parts connected to the manifold to be supplied with the cooling medium and the reaction gas, respectively.

The partition wall channel of the cathode bipolar plate has a recessed portion recessed in a direction from the one side to the other side of the anode bipolar plate to form a third opened space, in which the second opened space overlaps with the third opened space to share the cooling medium of the cooling channel with the partition wall channel.

The cooling channel and the gas channel of the anode bipolar plate may extend from the manifold in a straight direction and the partition wall channel of the cathode bipolar plate may extend from the manifold in the diagonal direction so that one partition wall channel overlaps with a plurality of different cooling channels.

The partition wall channel of the cathode bipolar plate may extend in a straight direction to be toward the direction in which the reaction gas flows and then extends in the diagonal direction.

The reaction layer and the porous separation layer may extend in the straight direction to be toward the direction in which the reaction gas flows and then extends in the diagonal direction.

The manifold may include an inlet side manifold provided at the front end part of the cathode bipolar plate and an outlet side manifold provided at the rear end part of the cathode bipolar plate.

As apparent from the above description, the fuel cell is advantageous in that the flow of reaction gas and cooling water may be uniformly distributed over the entire reaction region and the condensed water generated by the chemical reaction within the fuel cell may be smoothly discharged, thereby preventing the flow of reaction gas from clogging due to the condensed water.

BRIEF DESCRIPTION OF THE DRAWINGS

The above and other objects, features and advantages of the present disclosure will be more clearly understood from the following detailed description taken in conjunction with the accompanying drawings.

DETAILED DESCRIPTION

Hereinafter, a fuel cell according to an exemplary embodiment in the present disclosure will be described with reference to the accompanying drawings.

Figure 1:
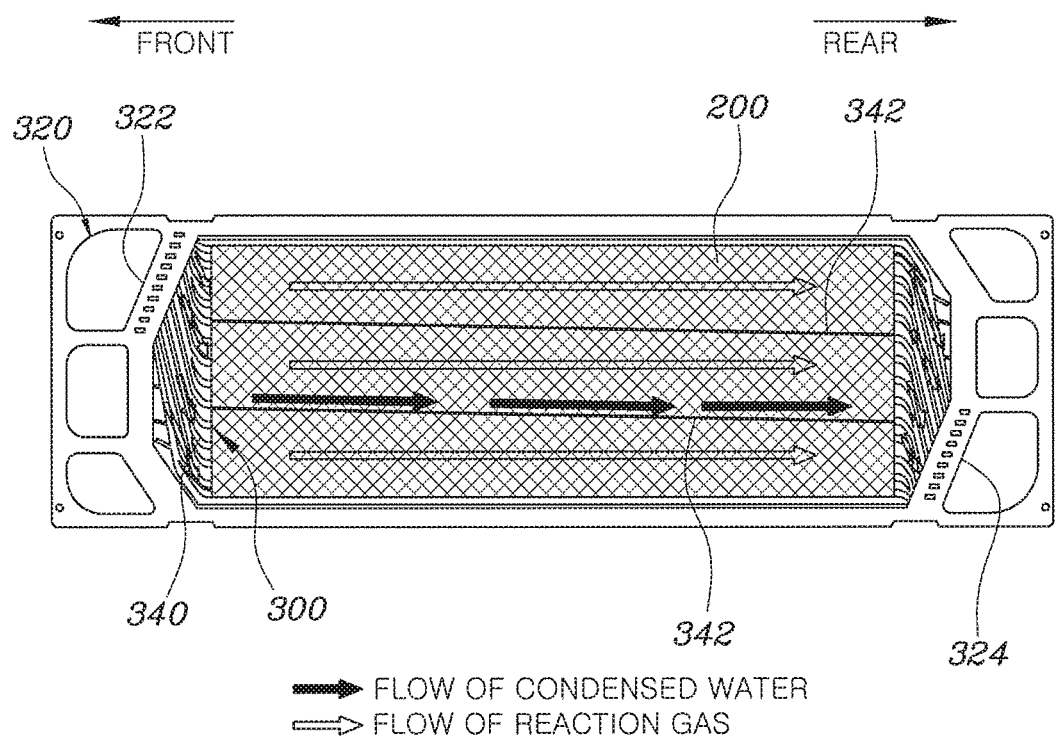
FIG. 1 is a plan configuration view of a fuel cell according to a first exemplary embodiment in the present disclosure.
Figure 2:
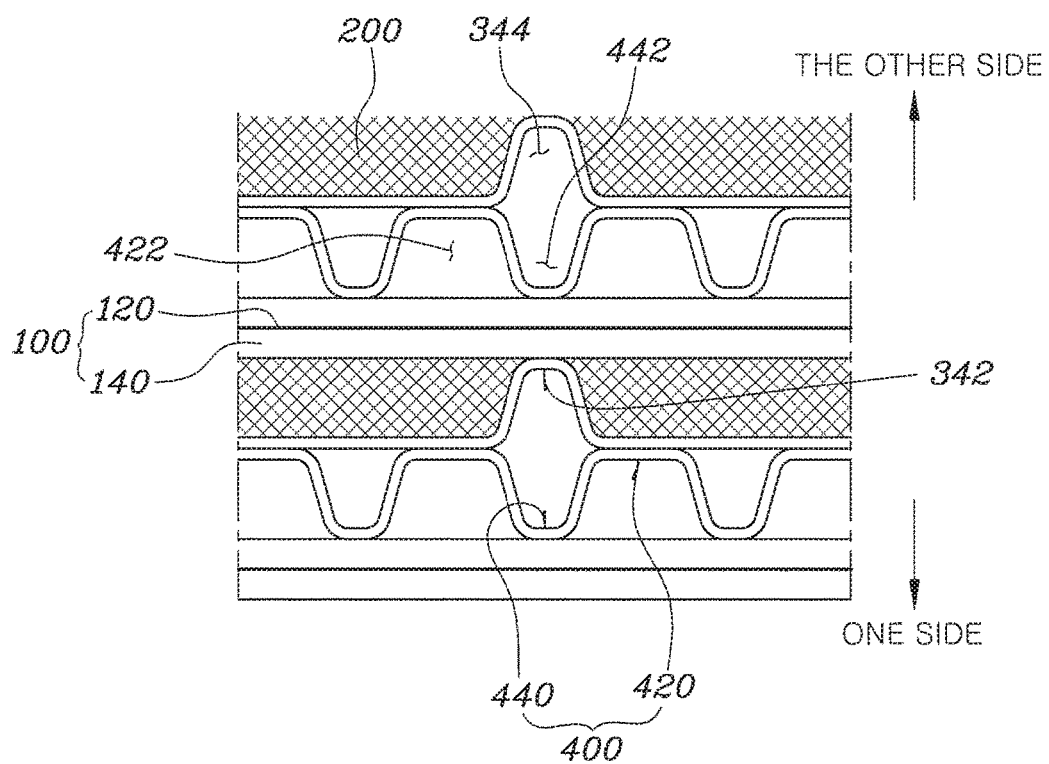
FIGS. 2 and 3 are partial cross-sectional configuration diagrams of the fuel cell illustrated in FIG. 1.
Figure 3:
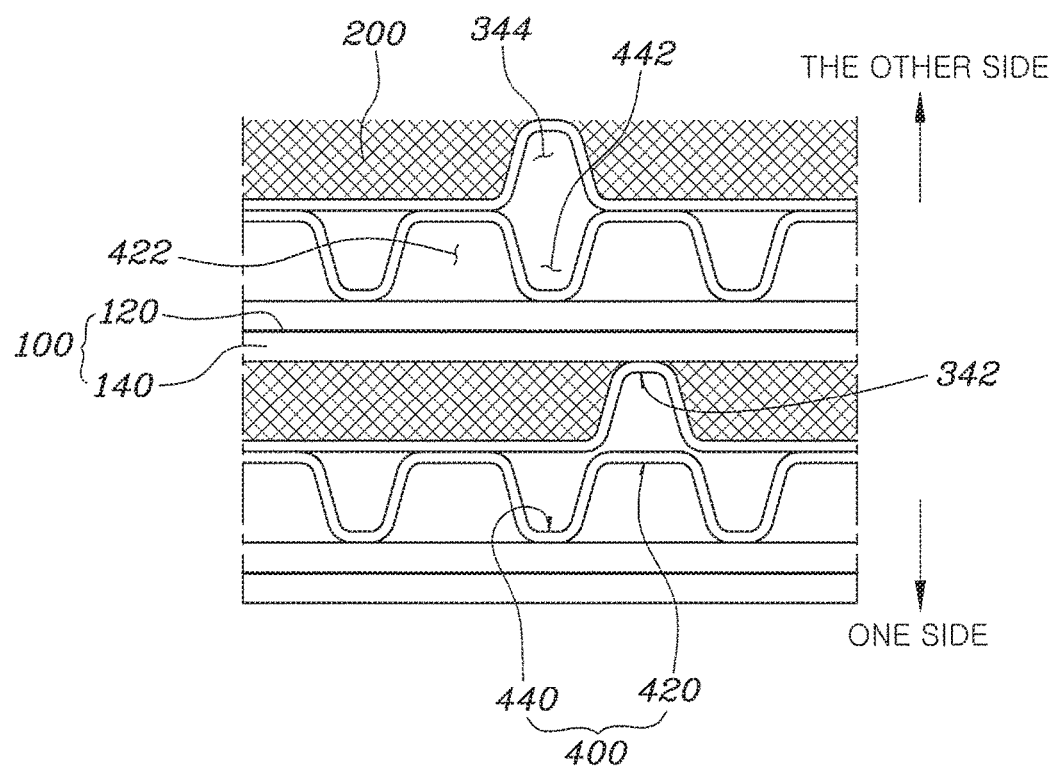
Figure 4:
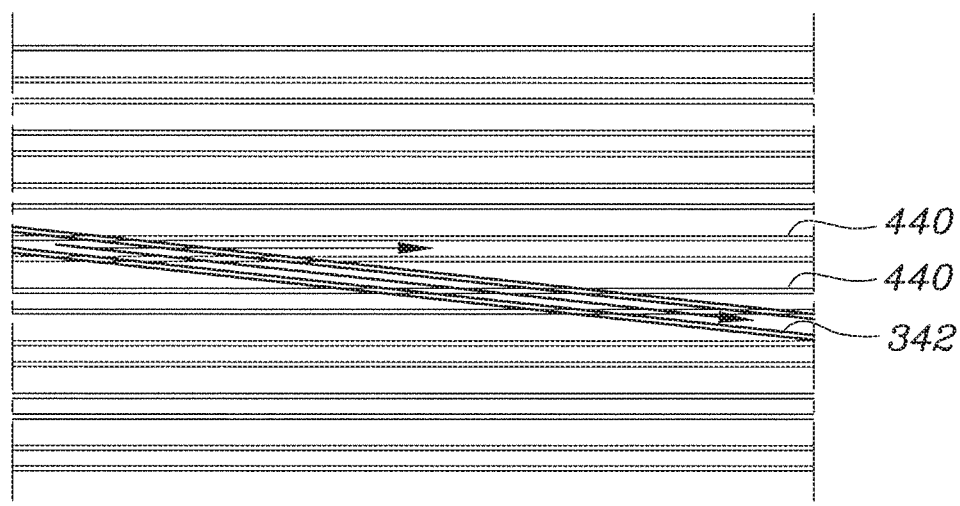
FIG. 4 is a diagram for describing the fuel cell illustrated in FIG. 1.
Figure 5:
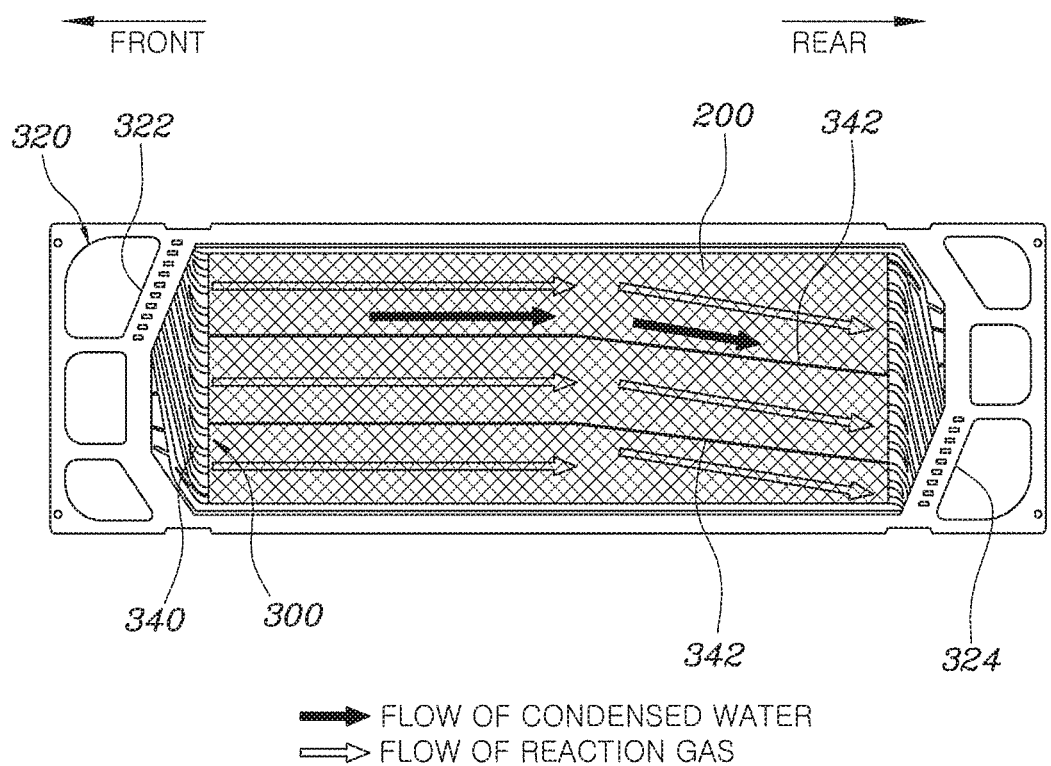
FIG. 5 is a diagram illustrating a fuel cell according to a second exemplary embodiment in the present disclosure.

FIG. 1 is a plan configuration view of a fuel cell according to a first exemplary embodiment in the present disclosure, FIGS. 2 and 3 are partial cross-sectional configuration diagrams of the fuel cell illustrated in FIG. 1, FIG. 4 is a diagram for describing the fuel cell illustrated in FIG. 1, and FIG. 5 is a diagram illustrating a fuel cell according to a second exemplary embodiment in the present disclosure.

A fuel cell according to an exemplary embodiment is supplied with reaction gas formed of oxidant gas and hydrogen gas and employs a chemical reaction of hydrogen and oxygen to generate electrical energy.

Here, heat is generated as a reaction by-product, and generated water is discharged as condensed water.

According to an exemplary embodiment in the present disclosure, cooling efficiency is increased by discharging generated water within a fuel cell and by smoothly moving flow of a cooling medium which cools heat.

As illustrated in FIGS. 1 and 2, a fuel cell according to an exemplary embodiment in the present disclosure includes: a reaction layer 100 having a membrane electrode assembly (MEA) 120 and gas diffusion layers (GDLs) 140 each of which are disposed at both side surfaces of the MEA 120. A porous separation layer 200 has one surface, which adheres to one surface of the reaction layer 100, and is supplied with reaction gas. A cathode bipolar plate 300 has a panel shape and is adhered to another surface of the porous separation layer 200. The cathode bipolar plate 300 includes a front end part having a manifold 320 that is supplied with reaction gas and having a plurality of diffusion channels 340 through which the reaction gas directs from the manifold 320 toward the porous separation layer 200. Some of the diffusion channels 340 extend to a rear end part of the cathode bipolar plate 300. The cathode bipolar plate 320 further includes a partition wall channel 342 separating the porous separation layer 200. The partition wall channel 342 extends in a direction in which the reaction gas flows and then extends in a diagonal direction.

The MEA 120 and the GDL 140 of the reaction layer 100 generate electrical energy by an electrochemical reaction in the reaction gas that includes hydrogen gas and oxidant gas. Further, the porous separation layer 200 is adhered to one surface of the reaction layer 100, supplied with the reaction gas, and supplies the reaction gas to the reaction layer 100 depending on the flow. Here, the porous separation layer 200 may be made of a metal or carbon material, formed in a wire mesh structure, or made of a material formed with a plurality of micro openings formed by forming holes on a metal thin plate or scratching the metal thin plate.

The foregoing reaction layer 100 and porous separation layer 200 are obvious in the art to which the fuel cell field pertains, and therefore, a detailed description thereof will be omitted.

According to the present disclosure, in order to make the flow of the reaction gas and the discharge of the generated water efficient, the cathode bipolar plate 300 has the panel shape and adheres to the one surface of the porous separation layer 200. The front end part of the cathode bipolar plate 300 has the manifold 320 supplied with the reaction gas and has the plurality of diffusion channels 340 through which the reaction gas directs from the manifold 320 toward the porous separation layer 200. Some of the diffusion channels 340 extend to the rear end part of the cathode bipolar plate 300. The cathode bipolar plate 300 further includes the partition wall channel 342 separating the porous separation layer 200. The partition wall channel 342 extends in a direction in which the reaction gas flows and extends in the diagonal direction.

The front end part of the cathode bipolar plate 300 has the manifold 320 which includes an inlet side manifold 322 provided at the front end part of the cathode bipolar plate 300 and an outlet side manifold 324 provided at the rear end part of the cathode bipolar plate 300. That is, the reaction gas is supplied from the inlet side manifold 322 to generate the electrical energy, and the discharged generated water or the like is discharged through the outlet side manifold 324.

In particular, the cathode bipolar plate 300 has the plurality of diffusion channels 340 to direct from the manifold 320 toward the porous separation layer 200 to supply the reaction gas supplied from the manifold 320 to the porous separation layer 200, in which some of the diffusion channels 340 extend to the rear end part and crosses the porous separation layer 200 to form the partition wall channel 342 that separates the porous separation layer 200.

The partition wall channel 342 may extend in a diagonal direction that is a gravity direction to direct from a top toward a bottom, in a state in which the partition wall channel is applied to the fuel cell. According to the present disclosure, to easily discharge the generated water generated by the electrochemical reaction between the porous separation layer 200 and the reaction layer 100, as illustrated in FIG. 1, in a state in which the fuel cell stack is disposed in a vertical direction to the gravity direction, the generated water generated by the porous separation layer 200 may be smoothly discharged while flowing down in the gravity direction by the partition wall channel 342 that diagonally extends from top to bottom to direct from the front part toward the rear end. By this, under a condition that the generated water is excessively generated, as the generated water moves through the partition wall channel 342, the generated water is discharged to the outlet manifold 324 so as not to be accumulated inside the fuel cell, thereby securing and maintaining the efficiency of the fuel cell.

Referring to FIG. 2, the fuel cell may further include an anode bipolar plate 400 adhered to one surface of the cathode bipolar plate 300 and repeatedly bent in one direction and the opposite direction to form a gas channel 420 through which the reaction gas passes to an opened space 422 of one side thereof and a cooling channel 440 through which a cooling medium passes to an opened space 442 of the opposite side thereof.

The cooling channel 440 and the gas channel 420 of the anode bipolar plate 400 have the front end parts connected to the manifold 320 to be supplied with the cooling medium and the reaction gas, respectively.

That is, the anode bipolar plate 400 adheres to one surface of the cathode bipolar plate 300 and is repeatedly bent in one direction and the opposite direction to form the gas channel 420 and the cooling channel 440. Here, the reaction gas supplied from the manifold 320 passes to the gas channel 420 formed at one side of the anode bipolar plate 400 and the cooling medium passes to the cooling channel 440 formed at the other side thereof. By this, the reaction gas is supplied to the reaction layer 100 which is adhered to one side of the anode bipolar plate 400, and further, a space to move the cooling medium through the cathode bipolar plate 300 adhering to another side of the anode bipolar plate 400 is formed, thereby smoothly moving the cooling medium.

In particular, as illustrated in FIG. 3, as the partition wall channel 342 of the cathode bipolar plate 300 protrudes to the opposite side to form an opened space 344 at one side and the cooling channel 400 of the anode bipolar plate 400 has the opened space 442 at the other side, an overlapping part with the cooling channel 440 may be formed on an extension line of the partition wall channel 342 to commonly use the cooling medium of the cooling channel 440 with the partition wall channel 342.

By doing so, the partition wall channel 342 of the cathode bipolar plate 300 has a space 344 opened to one side and the opened space 442 of the cooling channel 440 of the anode bipolar plate 400 is formed at the other side. In particular, the partition wall channel 342 extends in the diagonal direction to form the part with which the partition wall channel 342 and the cooling channel 440 overlaps on the extension line of the partition wall channel 342 to commonly use the cooling medium of the cooling channel 440 with the partition wall channel 342, thereby improving the cooling efficiency.

That is, the cooling channel 440 and the gas channel 420 of the anode bipolar plate 400 extend from the manifold 300 in a straight direction and the partition wall channel 342 of the cathode bipolar plate 300 extends from the manifold 320 in a diagonal direction so that one partition wall channel 342 overlaps with a plurality of different cooling channels 440. As illustrated in FIG. 3, the partition wall channel 342 may extend in the diagonal direction so as not to commonly use the opened space with any cooling channel 440 and to commonly use the opened space with other cooling channels 440, thereby preventing the cooling medium flowing in the cooling channel 440 from excessively circulating to the partition wall channel 342 side.

As such, as the cooling channel 440 of the anode bipolar plate 400 extends in the straight direction, the heat generated by the electrochemical reaction in the gas channel 420, the porous separation layer 200, and the reaction layer 100 may be cooled. In particular, as illustrated in FIG. 4, as the partition wall channel 342 extends in the diagonal direction, the part where one barrier channel 342 overlaps with the plurality of cooling channels 440 occurs, and thus, the cooling medium of the cooling channel 440 moves through the partition wall channel 342 to reduce a difference pressure due to the flow of the cooling medium, thereby increasing the cooling efficiency. As such, the cooling medium moving through the cooling channel 440 of the anode bipolar plate 400 may be also distributed into the partition wall channel 342 to prevent the cooling water from permeating into the space in which the electrochemical reaction is made due to the excessive pressure difference.

As described above, the fuel cell has a structure in which the reaction layer 100, the anode bipolar plate 400, the cathode bipolar plate 300, and the reaction layer 100 are sequentially stacked from one side toward the other side, in which the reaction gas supplied from the manifold 320 moves through the porous separation layer 200, the reaction layer 100, and the gas channel 420 of the anode bipolar plate 400, thereby generating the electrical energy by the electrochemical reaction. The cooling medium supplied from the manifold 320 is distributed into the cooling channel 440 of the anode bipolar plate 400 and the partition wall channel 342 of the cathode bipolar plate 300 and moves, thereby performing the efficient cooling and preventing the pressure difference of the cooling water from reducing.

Referring to FIG. 5, in a fuel cell according to a secondary embodiment in the present disclosure, the partition wall channel 342 of the cathode bipolar plate 300 may extend by a predetermined distance in a straight direction toward a direction in which the reaction gas flows and may extend in the diagonal direction.

That is, the reaction gas supplied through the inlet side manifold 322 is equally distributed in the diffusion channel 340 of the cathode bipolar plate 300. Due to the reaction gas supplied through the manifold 320, the generated water is not stagnated at the inlet side manifold 322 and the generated water is accumulated from a specific point extending by a predetermined distance. Therefore, as the partition wall channel 342 of the cathode bipolar plate 300 extends in the straight direction with respect to the part where the generated water is not stagnated as the reaction gas from the manifold 320 is equally distributed and extends in the diagonal direction from the point where the reaction gas is stagnated to make the generated water smoothly flow in the gravity direction, thereby discharging the generated water.

Here, the point where the generated water depending on the flow of the reaction gas is generated and stagnated may be derived by the experiment and may be differently set according to the specifications of the fuel cell.

In addition, similar to the partition wall channel 342, the reaction layer 100 and the porous separation layer 200 may extend by a predetermined distance in the straight direction toward the direction in which the reaction gas flows and may extend in the diagonal direction.

As such, the reaction layer 100 and the porous separation layer 200 likewise extend in the diagonal direction at the point where the partition wall channel 342 extends in the diagonal direction, and thus, the reaction gas equally distributed in the inlet side manifold 322 is equally distributed up to the outlet side manifold 324 and moves.

By this, the uniformity of the difference pressure and the use of the reaction area due to the equal distribution of the reaction gas may be secured, and the generated water generated at the specific point may easily flow over the partition wall channel 342 of the cathode bipolar plate 300 to be discharged.

According to the fuel cell in accordance with the exemplary embodiments in the present disclosure, the flow of reaction gas and cooling water may be uniformly distributed over the whole of the reaction region and the discharge of the condensed water generated by the chemical reaction within the fuel cell may be smoothly performed, thereby preventing the flow of reaction gas from clogging due to the condensed water.

Although the present disclosure has been shown and described with respect to specific exemplary embodiments, it will be obvious to those skilled in the art that the present disclosure may be variously modified and altered without departing from the spirit and scope of the present disclosure as defined by the following claims.

What is claimed is:
1. A fuel cell, comprising:
  a reaction layer including: a membrane electrode assembly (MEA); and gas diffusion layers (GDLs) each of which is disposed at both side surfaces of the MEA;

a porous separation layer having one surface adhered to one surface of the reaction layer and supplied with reaction gas; and a cathode bipolar plate having a panel shape and adhered to another surface of the porous separation layer, wherein a front end part of the cathode bipolar plate having a manifold that is supplied with the reaction gas and having a plurality of diffusion channels through which the reaction gas directs from the manifold toward the porous separation layer, wherein the cathode bipolar plate has a partition wall channel having an enclosed pipe shape, which separates the porous separation layer, which extends in a direction in which the reaction gas flows, and which extends downwardly in a diagonal direction from a first portion of the front end part of the cathode bipolar plate to a second portion of a rear end part of the cathode bipolar plate with respect to the fuel cell in a front to rear direction, wherein the first portion of the front end part is located higher than the second portion of the rear end part from top to bottom in a gravitational direction, and wherein condensed water or a cooling medium diagonally passes through the partition wall channel from the first portion to the second portion in the front to rear direction.

2. The fuel cell of claim 1, wherein the partition wall channel of the cathode bipolar plate extends in the diagonal direction that is the gravitational direction to direct from a top toward a bottom of the fuel cell in a state in which the partition wall channel is applied to the fuel cell.

3. The fuel cell of claim 1, further comprising:

an anode bipolar plate adhered to one surface of the cathode bipolar plate and repeatedly bent in one direction and the opposite direction to form a gas channel through which the reaction gas passes to a first opened space formed at one side of the anode bipolar plate and a cooling channel through which the cooling medium passes to a second opened space formed at another side of the anode bipolar plate.

4. The fuel cell of claim 3, wherein the cooling channel and the gas channel of the anode bipolar plate have front end parts which are connected to the manifold, respectively.

5. The fuel cell of claim 3, wherein the partition wall channel of the cathode bipolar plate has a recessed portion recessed in a direction from the one side to the other side of the anode bipolar plate to form a third opened space, in which the second opened space overlaps with the third opened space to share the cooling medium of the cooling channel with the partition wall channel.

6. The fuel cell of claim 5, wherein the cooling channel and the gas channel of the anode bipolar plate extend from the manifold in a straight direction and the partition wall channel of the cathode bipolar plate extends from the manifold in the diagonal direction so that one partition wall channel overlaps with a plurality of different cooling channels.

7. The fuel cell of claim 1, wherein the manifold includes: an inlet side manifold provided at the front end part of the cathode bipolar plate; and an outlet side manifold provided at the rear end part of the cathode bipolar plate.

8. A fuel cell, comprising:
a reaction layer including:
a membrane electrode assembly (MEA); and gas diffusion layers (GDLs) each of which is disposed at both side surfaces of the MEA;

a porous separation layer having one surface adhered to one surface of the reaction layer and supplied with reaction gas; and a cathode bipolar plate having a panel shape and adhered to another surface of the porous separation layer, wherein a front end part of the cathode bipolar plate having a manifold that is supplied with the reaction gas and having a plurality of diffusion channels through which the reaction gas directs from the manifold toward the porous separation layer, wherein the manifold includes an inlet side manifold provided at the front end part of the cathode bipolar plate, and an outlet side manifold provided at a rear end part of the cathode bipolar plate, wherein the cathode bipolar plate has a partition wall channel having an enclosed pipe shape, which separates the porous separation layer, which extends in a direction in which the reaction gas flows, and which extends in a front to rear direction from the inlet side manifold of the cathode bipolar plate to the outlet side manifold of the cathode bipolar plate downwardly in a diagonal direction with respect to the fuel cell, and wherein the inlet side manifold of the cathode bipolar plate is located higher than the outlet side of the cathode bipolar plate in a state in which the cathode bipolar plate is applied to the fuel cell.

9. The fuel cell of claim 8, wherein the partition wall channel of the cathode bipolar plate extends in the diagonal direction that is the gravitational direction to direct from a top toward a bottom of the fuel cell in a state in which the partition wall channel is applied to the fuel cell.

10. A fuel cell, comprising:
a reaction layer including: a membrane electrode assembly (MEA); and gas diffusion layers (GDLs) each of which is disposed at both side surfaces of the MEA;
a porous separation layer having one surface adhered to one surface of the reaction layer and supplied with reaction gas;
a cathode bipolar plate having a panel shape and adhered to another surface of the porous separation layer; and
an anode bipolar plate having a cooling channel through which a cooling medium passes and a gas channel through which the reaction gas passes, wherein a front end part of the cathode bipolar plate having a manifold that is supplied with the reaction gas and having a plurality of diffusion channels through which the reaction gas directs from the manifold toward the porous separation layer, wherein the cathode bipolar plate has a partition wall channel having an enclosed pipe shape, which separates the porous separation layer, which extends in a direction in which the reaction gas flows, and which extends in a front to rear direction from a first portion of the front end part of the cathode bipolar plate to a second portion of a rear end part of the cathode bipolar plate downwardly in a diagonal direction with respect to the fuel cell, and wherein the partition wall channel overlaps with a plurality of different cooling channels of the anode bipolar plate.

11. A fuel cell, comprising:
a reaction layer including: a membrane electrode assembly (MEA); and gas diffusion layers (GDLs) each of which is disposed at both side surfaces of the MEA;
a porous separation layer having one surface adhered to one surface of the reaction layer and supplied with reaction gas; and a cathode bipolar plate having a panel shape and adhered to another surface of the porous separation layer, wherein a front end part of the cathode bipolar plate having a manifold that is supplied with the reaction gas and having a plurality of diffusion channels through which the reaction gas directs from the manifold toward the porous separation layer, wherein the cathode bipolar plate has a partition wall channel having an enclosed pipe shape, which separates the porous separation layer, which extends in a straight direction perpendicular to a stacked direction of the fuel cell to be toward a direction in which the reaction gas flows and then extends downwardly in a diagonal direction, and which extends in the straight direction and then diagonally extends from a first portion of the front end part of the cathode bipolar plate to a second portion of a rear end part of the cathode bipolar plate with respect to the fuel cell in a front to rear direction, wherein the first portion of the front end part is located higher than the second portion of the rear end part from top to bottom in a gravitational direction, and wherein condensed water or a cooling medium passes in the straight direction and then diagonally passes through the partition wall channel from the first portion to the second portion in the front to rear direction.

12. The fuel cell of claim 11, wherein the reaction layer and the porous separation layer extend in the straight direction to be toward the direction in which the reaction gas flows and then extends in the diagonal direction.

* * * * *